(12) United States Patent
Hamada

(10) Patent No.: US 10,169,923 B2
(45) Date of Patent: Jan. 1, 2019

(54) WEARABLE DISPLAY SYSTEM THAT DISPLAYS A WORKOUT GUIDE

(71) Applicant: Sony Corporation, Tokyo (JP)

(72) Inventor: Gen Hamada, Tokyo (JP)

(73) Assignee: SONY CORPORATION, Tokyo (JP)

( * ) Notice: Subject to any disclaimer, the term of this patent is extended or adjusted under 35 U.S.C. 154(b) by 29 days.

(21) Appl. No.: 15/394,019

(22) Filed: Dec. 29, 2016

(65) Prior Publication Data

US 2017/0109939 A1   Apr. 20, 2017

Related U.S. Application Data

(63) Continuation of application No. 14/886,758, filed on Oct. 19, 2015, now Pat. No. 9,569,898, which is a
(Continued)

(30) Foreign Application Priority Data

Feb. 14, 2012  (JP) ................................. 2012-029397

(51) Int. Cl.
*G06T 19/00*   (2011.01)
*G02B 27/01*   (2006.01)
(Continued)

(52) U.S. Cl.
CPC ............ *G06T 19/006* (2013.01); *G02B 27/01* (2013.01); *G02B 27/017* (2013.01); *G06F 1/163* (2013.01);
(Continued)

(58) Field of Classification Search
CPC ......... G06T 7/00; G06T 19/006; G06T 19/00; G06T 19/003; G06F 1/163; G06F 3/005;
(Continued)

(56) References Cited

U.S. PATENT DOCUMENTS 7,706,972 B2 *  4/2010  Matsuo .............. G01C 21/3635
                                                  340/988
8,083,589 B1    12/2011  Kavars
(Continued)

FOREIGN PATENT DOCUMENTS

CN       102204814 A     10/2011
JP       2011-212347 A   10/2011

OTHER PUBLICATIONS

Combined Chinese Office Action and Search Report dated Feb. 13, 2017 in Patent Application No. 201310046858.7 (with English Translation).

*Primary Examiner* — Diane Wills
(74) *Attorney, Agent, or Firm* — Xsensus LLP

(57) ABSTRACT

There is provided a display control device including an action information acquisition unit that acquires, at an action position of one actor, action information regarding a past action of another actor, an object generation unit that generates a virtual object for virtually indicating a position of the other actor during an action of the one actor based on the acquired action information, and a display control unit that causes a display unit displaying a surrounding scene to superimpose and display the generated virtual object during the action of the one actor.

18 Claims, 16 Drawing Sheets

Related U.S. Application Data continuation of application No. 13/717,940, filed on Dec. 18, 2012, now Pat. No. 9,235,933.

(51) Int. Cl.

| | |
|---|---|
| *G06F 3/0481* | (2013.01) |
| *G06F 3/147* | (2006.01) |
| *G06F 1/16* | (2006.01) |
| *G06F 3/0346* | (2013.01) |
| *G06F 3/01* | (2006.01) |

(52) U.S. Cl.
CPC ............ *G06F 3/013* (2013.01); *G06F 3/0346* (2013.01); *G06F 3/04815* (2013.01); *G06F 3/147* (2013.01); *G06T 19/003* (2013.01); *G02B 2027/014* (2013.01); *G02B 2027/0141* (2013.01); *G02B 2027/0178* (2013.01); *G06F 3/011* (2013.01); *G06T 19/00* (2013.01); *G09G 2370/022* (2013.01)

(58) Field of Classification Search
CPC ...... G06F 3/011; G06F 3/013; G06F 3/04815; G06F 3/0304; G06F 3/0346; G06F 3/012
See application file for complete search history.

(56) References Cited

U.S. PATENT DOCUMENTS

| | | | |
|---|---|---|---|
| 2003/0208335 A1* | 11/2003 | Unuma | A43B 3/0005 702/141 |
| 2004/0080434 A1 | 4/2004 | Watanabe et al. | |
| 2006/0092155 A1 | 5/2006 | Kida | |
| 2012/0277036 A1* | 11/2012 | Lee | A63B 69/3623 473/409 |
| 2013/0083003 A1* | 4/2013 | Perez | G06F 3/005 345/419 |
| 2013/0104057 A1 | 4/2013 | Leacock et al. | |
| 2014/0063055 A1* | 3/2014 | Osterhout | G06F 3/005 345/633 |

\* cited by examiner

FIG. 5

| | ITEM | | CONTENTS |
|---|---|---|---|
| 1 | USER ID | | ID |
| 2 | SEX | | MALE/FEMALE |
| 3 | AGE | | USED TO RETRIEVE RECORD OF SAME GENERATION |
| 4 | CLASSIFICATION | | CLASSIFICATION OF EXERCISE |
| 5 | DURATION (duration) | | DURATION IN WHICH EXERCISE IS PERFORMED(duration) |
| 6 | EXERCISE INFORMATION | | FOLLOWING ITEMS ARE RECORDED EVERY SECOND |
| | 6-1 | LATITUDE | VALUE OBTAINED BY PERFORMING POSITIONING WITH GPS OR THE LIKE AND PERFORMING CORRECTION WITH MAP DATA, USED TO CALCULATE TRAVELING DIRECTION USING FRONT AND REAR EXERCISE INFORMATION |
| | 6-2 | LONGITUDE | |
| | 6-3 | ALTITUDE | VALUE OBTAINED BY PERFORMING POSITIONING WITH GPS OR BAROMETER AND PERFORMING CORRECTION WITH MAP DATA |
| | 6-4 | TIME | MEASUREMENT TIME (HOUR, MINUTE, SECOND) |
| | 6-5 | EXERCISE CLASSIFICATION | EXERCISE CLASSIFICATION IS USED TO SELECT DISPLAY OBJECT, FOR EXERCISE CLASSIFICATION IS CHANGED FROM RUNNING TO CYCLING OR DRIVING IN SOME CASES |

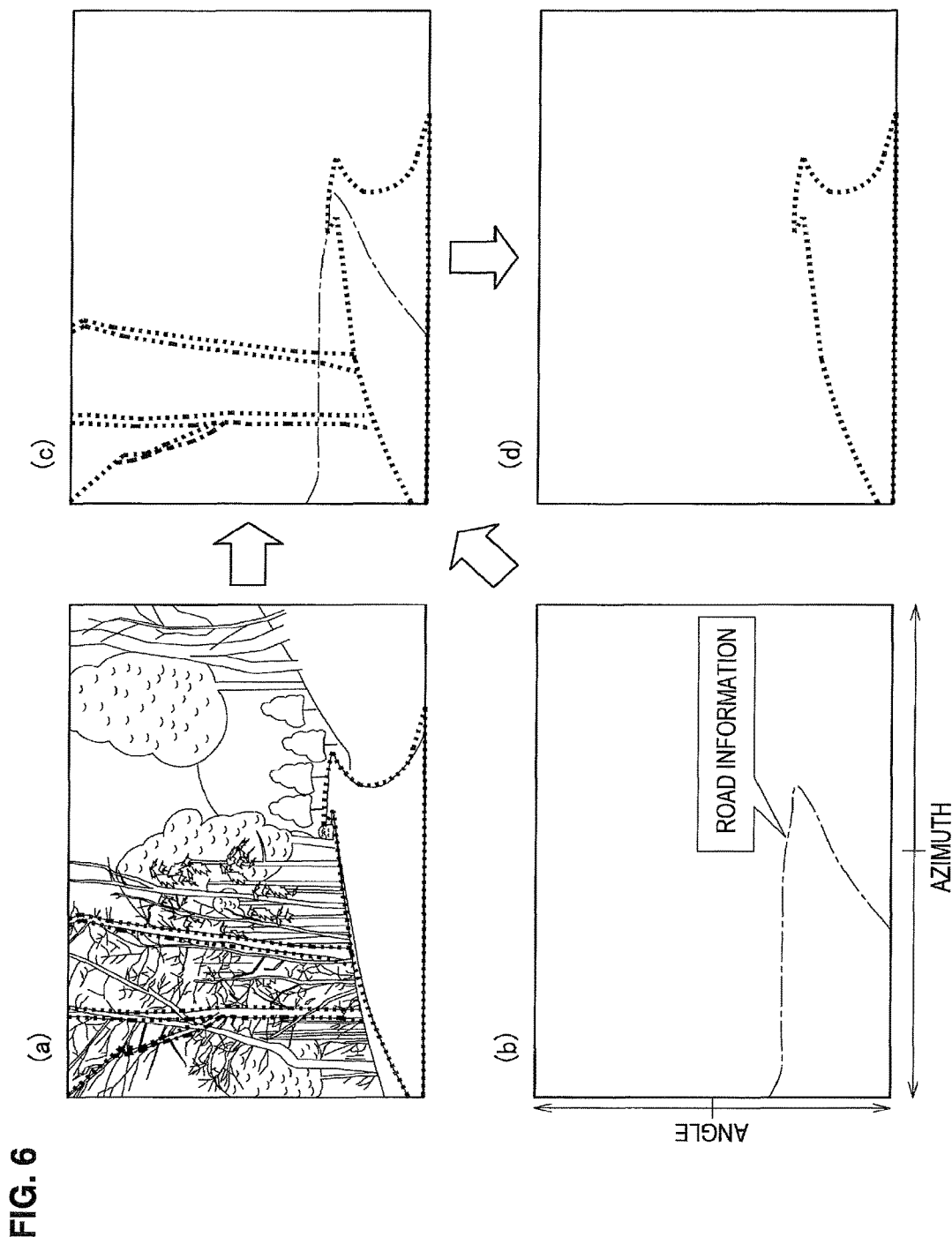

WEARABLE DISPLAY SYSTEM THAT DISPLAYS A WORKOUT GUIDE

CROSS-REFERENCE TO RELATED APPLICATION

This application is a continuation of U.S. application Ser. No. 14/886,758, filed Oct. 19, 2015, which is a continuation application U.S. application Ser. No. 13/717,940, filed on Dec. 18, 2012, which claims benefit to Japanese Priority Patent Application JP 2012-029397, filed in the Japan Patent Office on Feb. 14, 2012, the entire content of which is hereby incorporated by reference.

BACKGROUND

The present disclosure relates to a display control device, a display control method, and a program.

In recent years, athletes (actors) wear devices that can receive various kinds of information from the outside via a communication network or the like and perform exercises.

Japanese Unexamined Patent Application Publication (Translation of PCT Application) No. 2002-507734 discloses a technology for providing information regarding a traveling distance of an athlete to the athlete or a device used by the athlete during an exercise based on global positioning satellite data.

SUMMARY

When one actor acts at a given action position, the actor wants to know the past actions of other actors at the same position in some cases. This is because when the one actor knows the past actions of the other actors at the same position, for example, the one actor can perform an action appropriate for a situation, referring to the past action of the other actors.

However, in Japanese Unexamined Patent Application Publication (Translation of PCT Application) No. 2002-507734, a technology for informing one athlete of exercise information regarding other athletes is not mentioned.

It is desirable to provide given display realistically using action information a past action of regarding another actor during an action of one actor.

According to an embodiment of the present disclosure, there is provided a display control device including an action information acquisition unit that acquires, at an action position of one actor, action information regarding a past action of another actor, an object generation unit that generates a virtual object for virtually indicating a position of the other actor during an action of the one actor based on the acquired action information, and a display control unit that causes a display unit displaying a surrounding scene to superimpose and display the generated virtual object during the action of the one actor.

According to the above-described configuration, the object generation unit generates the virtual object for virtually indicating the position of the other actor during the action of the one actor based on the acquired action information. Then, the display control unit causes the display unit displaying a surrounding scene to superimpose and display the generated virtual object during the action of the one actor. Thus, when the one actor is acting in a specific place, the display unit displays the virtual object corresponding to the action information regarding the past action of the other actor at the same place. That is, during the action of the one actor, the display is realized realistically using the past action information of the other actor. As a result, the one actor continues the action while viewing the virtual object displayed during the action. Therefore, the one actor can compete with the other actor or can act based on the action of the other actor instead of a guide.

Further, according to an embodiment of the present disclosure, there is provided a display control method including acquiring, at an action position of one actor, action information regarding a past action of another actor, generating a virtual object for virtually indicating a position of the other actor during an action of the one actor based on the acquired action information, and causing a display unit displaying a surrounding scene to superimpose and display the generated virtual object during the action of the one actor.

Further, according to an embodiment of the present disclosure, there is provided a program for causing a computer to execute acquiring, at an action position of one actor, action information regarding a past action of another actor, generating a virtual object for virtually indicating a position of the other actor during an action of the one actor based on the acquired action information, and causing a display unit displaying a surrounding scene to superimpose and display the generated virtual object during the action of the one actor.

According to the embodiments of the present disclosure described above, it is possible to provide realistic display using action information regarding a past action of another actor during an action of one actor.

BRIEF DESCRIPTION OF THE DRAWINGS

FIG. 5 is a diagram illustrating a data structure of action information downloaded from a server;

FIG. 6 is a diagram illustrating an example of a method of identifying the range of a road from a captured image;

DETAILED DESCRIPTION OF THE EMBODIMENTS

Figure 1:
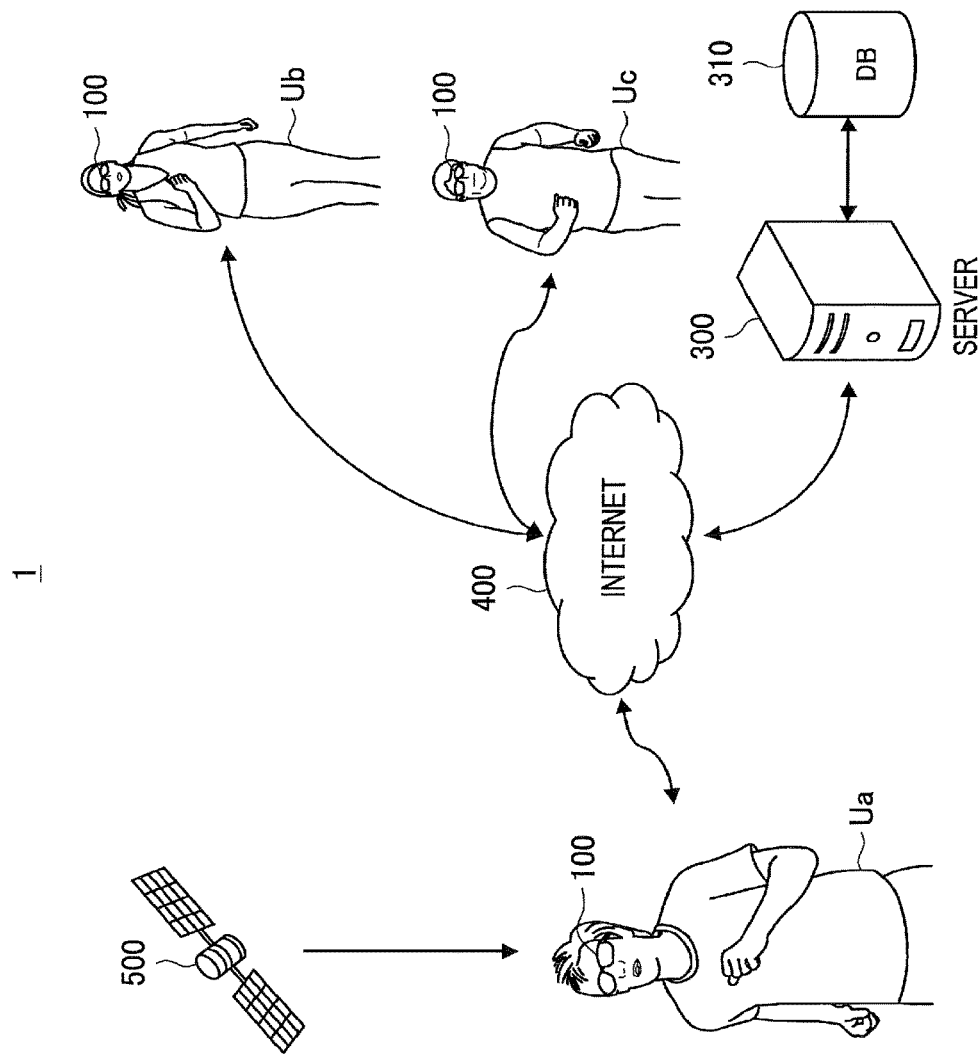
FIG. 1 is a diagram illustrating an example of a general configuration of a display system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Configuration of Display System
2. Configuration of Display Device
2-1. Example of Hardware Configuration of Display Device
2-2. Example of Functional Configuration of Display Device
3. Display Example of Virtual Object in Display Unit
4. Flow of Process Performed by Display Device
5. Case in Which Virtual Object Is Displayed
6. Summarization <1. Configuration of Display System>

Figure 2:
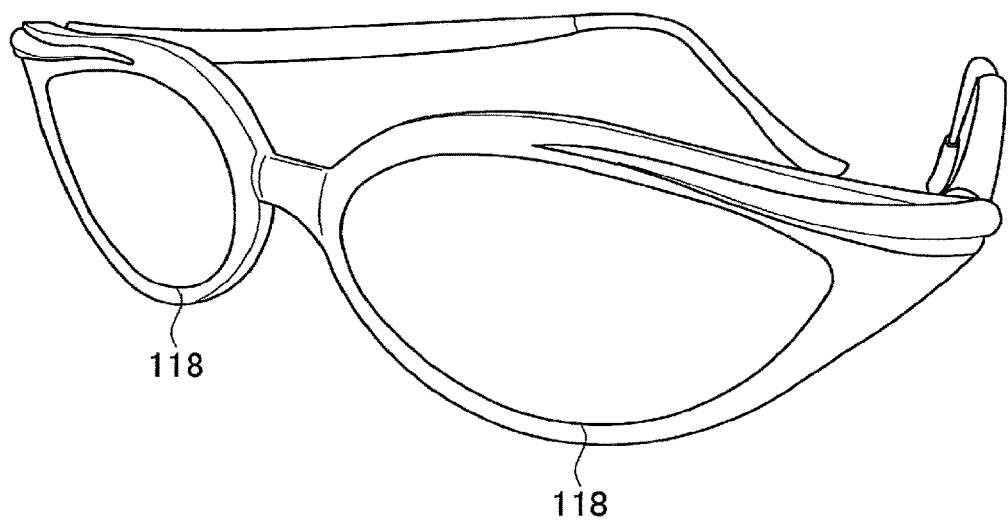
FIG. 2 is a diagram illustrating a configuration example of the outer appearance of a display device according to the embodiment.

An example of the configuration of a display system 1 according to an embodiment of the present disclosure will be described with reference to FIGS. 1 and 2. FIG. 1 is a diagram illustrating an example of a general configuration of the display system 1 according to the embodiment of the present disclosure. FIG. 2 is a diagram illustrating a configuration example of the outer appearance of a display device 100 according to the embodiment.

The display system 1 is a system that displays a virtual object (which indicates a state in which other users run) based on past exercise histories of the other users on a display device 100 which one user wears when the one user is running. Thus, the one user (for example, a user Ua shown in FIG. 1) can run while viewing a virtual object displayed on the display device 100, as if the user were competing with other users (users Ub and Uc shown in FIG. 1) who have run in the past.

As shown in FIG. 1, the display system 1 includes the display device 100 which the user wears, a server 300, and a network 400 connecting the display device 100 and the server 300 in a communicable way.

As shown in FIG. 2, the display device 100 is a glasses-type display device which a user (here, the user Ua will be exemplified for description) wears on his or her face. Specifically, the display device 100 is sunglasses which the user wears while running. The display device 100 includes display units 118 which are transmission-type displays in lens portions of the sunglasses. Therefore, the user Ua can view a surrounding scene from the display units 118 even when the user is wearing the display device 100. The display device 100 acquires position information (for example, current position information) regarding the display device 100 by communicating with a GPS satellite 500.

The display device 100 acquires exercise histories of past exercises of other users (the users Ub and Uc) at the current position from the server 300. The display device 100 displays a virtual object by superimposing the virtual object on the scene based on the acquired past exercise histories of the other users. The details of the display of the virtual object will be described below.

The server 300 manages the past exercise histories of the users Ua, Ub, and Uc. The exercise histories are sequentially received from the display device 100 and are stored in a database 310 connected to the server 300. Not only the exercise history of each user but also map information or the like is stored in the database 310. The map information also includes, for example, road information regarding a road on which the users run.

The server 300 can communicate with the display device 100 which each of the users Ua, Ub, and Uc wears via the network. The server 300 receives the exercise history of each user from the display device 100 which each of the users Ua, Ub, and Uc wears and stores the exercise history of each user in the database 310. Further, the server 300 transmits the past histories of the other users Ub and Uc to the display device 100 which the one user Ua wears in response to a request of the one user Ua (the display device 100 which the user Ua wears).

<2. Configuration of Display Device>

(2-1. Example of Hardware Configuration of Display Device)

Figure 3:
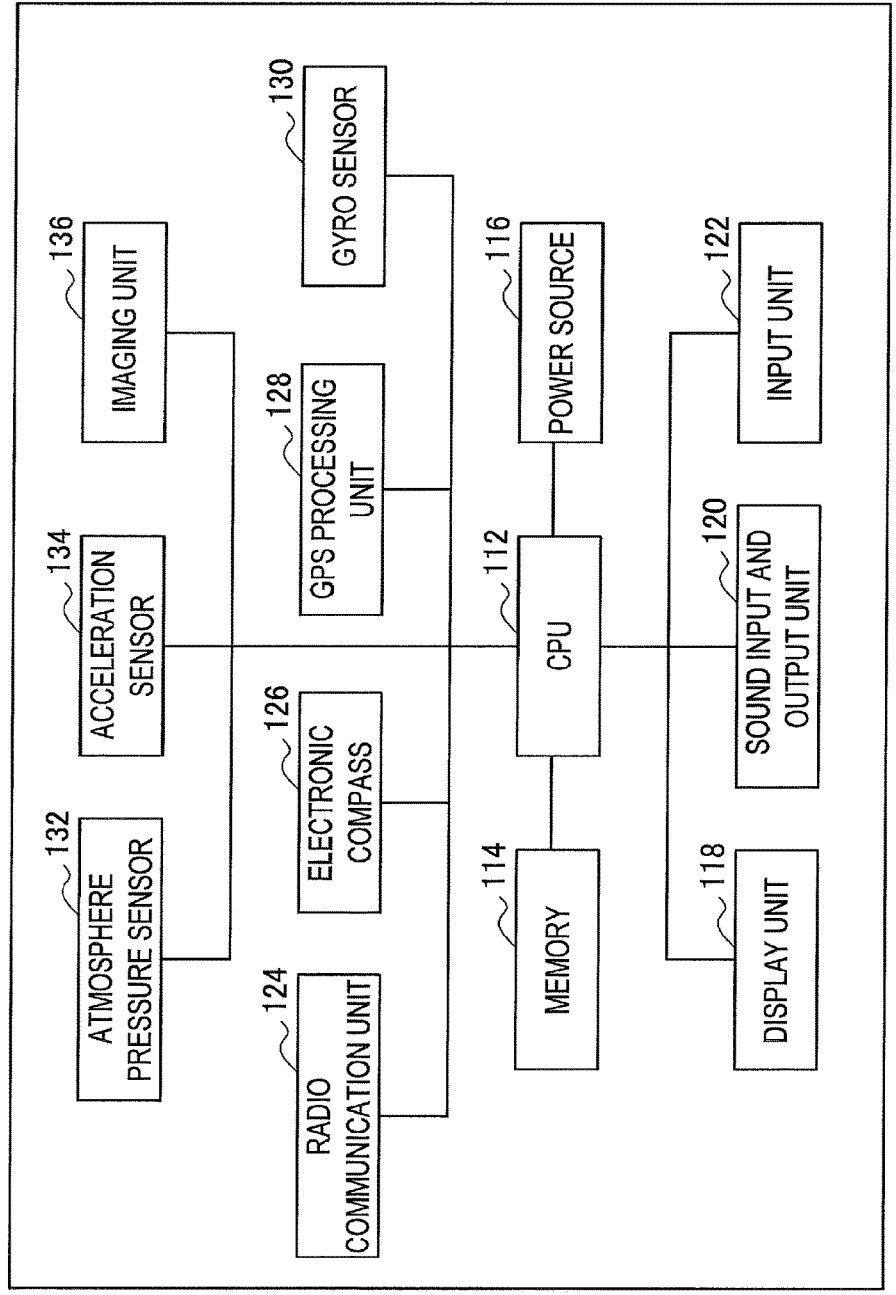
FIG. 3 is a block diagram illustrating an example of a hardware configuration of the display device according to the embodiment.

An example of a hardware configuration of the display device 100 according to the embodiment will be described with reference to FIG. 3. FIG. 3 is a block diagram illustrating an example of the hardware configuration of the display device 100 according to the embodiment.

As shown in FIG. 3, the display device 100 includes a CPU 112, a memory 114, a power source 116, a display unit 118, a sound input and output unit 120, and an input unit 122. The display device 100 further includes a radio communication unit 124, an electronic compass 126, a GPS processing unit 128, a gyro sensor 130, an atmosphere pressure sensor 132, an acceleration sensor 134, and an imaging unit 136.

The CPU 112 functions as an arithmetic processing device and a control device and controls general operations in the display device 100 according to various programs. The CPU 112 may be a microprocessor. Further, the CPU 112 can realize various functions according to various programs.

The memory 114 can store programs, calculation parameters, and the like used by the CPU 112. Further, the memory 114 is a data storage device and can include a memory medium, a recording device that records data in the memory medium, a reading device that reads the data from the memory medium, and a deletion device that deletes data recorded in the memory medium.

The power source 116 supplies power to constituent components (the CPU 112, the display unit 118, and the like) included in the display device 100.

The display unit 118 is, for example, a liquid crystal display (LCD) or an organic light emitting diode (OLED) display. The display unit 118 can supply information by displaying a screen for the user. The display unit 118 according to this embodiment is a transmission-type display that displays the surroundings and can superimpose and display a virtual object to be described below.

The sound input and output unit 120 includes, for example, a speaker that outputs a sound based on a sound signal and a microphone that can collect a sound. For example, the speaker may output action information (exercise information) regarding the user or operation information input through the input unit 122 as a sound.

The input unit 122 is a unit through which the user inputs information. The input unit 122 includes, for example, a touch sensor, a button, a switch, a lever, or the like which the user can operate. The user selects setting information such as selection or determination by operating the input unit 122. The input unit 122 supplies the selected setting information or the like to the CPU 112.

The radio communication unit 124 performs radio communication with the server 300 (see FIG. 1) via the network 400. The radio communication unit 124 receives the exercise histories of the other users from the server 300. Further, the radio communication unit 124 transmits the exercise information regarding the user who wears the display device 100 to the server 300.

The electronic compass 126 is a magnetic sensor that detects an azimuth direction of a sight line of the user who wears the display device 100. The electronic compass 126 detects geomagnetism and identifies the azimuth. The electronic compass 126 supplies the detected data to the CPU 112.

The GPS processing unit 128 acquires position information regarding the display device 100 (user) based on a signal received from the GPS satellite 500 (see FIG. 1). For example, the GPS processing unit 128 acquires information regarding a latitude, a longitude, and an altitude as the position information. The GPS processing unit 128 supplies the acquired position information to the CPU 112.

The gyro sensor 130 is an angular velocity sensor that detects the angle of the sight line of the user who wears the display device 100. The gyro sensor 130 may be, for example, a triaxial gyro sensor that detects, as a voltage value, a velocity (angular velocity) at which a rotational angle around the X axis, the Y axis, and the Z axis varies. The gyro sensor 130 supplies data of the detected angular velocity to the CPU 112.

The atmosphere pressure sensor 132 is a sensor that detects the altitude of the current position of the user. The atmosphere pressure sensor 132 detects the altitude as a predetermined sampling frequency and supplies the detected data to the CPU 112.

The acceleration sensor 134 is a sensor that detects a movement of the user who wears the display device 100. For example, the acceleration sensor 134 detects whether the user is moving (exercising) or has stopped. The acceleration sensor 134 may be a triaxial acceleration sensor that detects each of an acceleration in the X axis direction, an acceleration in the Y axis direction, and an acceleration in the Z axis direction. The acceleration sensor 134 supplies data of the detected acceleration to the CPU 112.

The imaging unit 136 includes an imaging element such as a CMOS and images the visual field of the user. The imaging unit 136 images a still image or a moving image via a lens under the control of the CPU 112. The imaging unit 136 supplies the captured image to the CPU 112.

(2-2. Example of Functional Configuration of Display Device)

Figure 4:
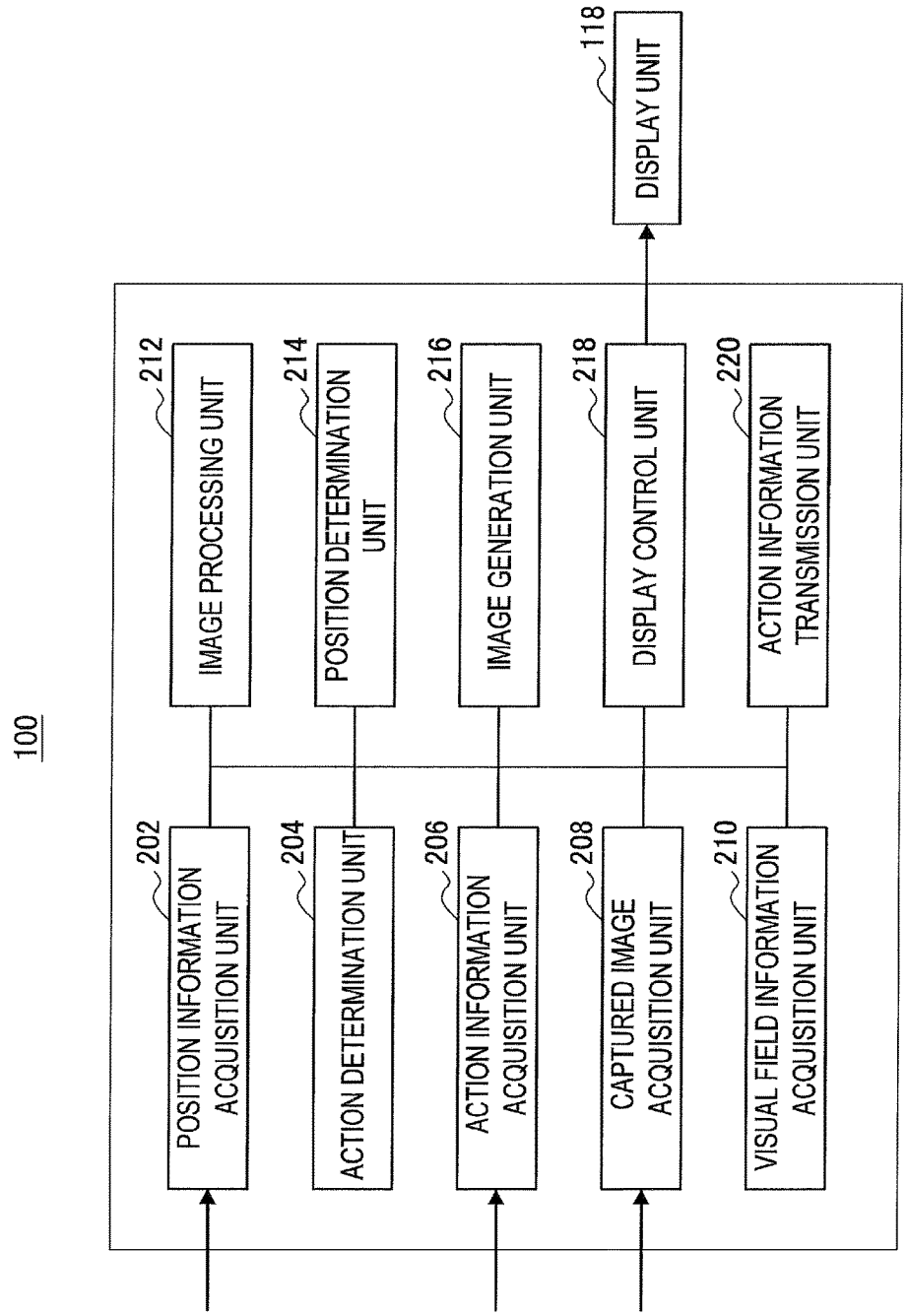
FIG. 4 is a block diagram illustrating an example of a functional configuration of the display device according to the embodiment.

An example of a functional configuration of the display device 100 according to the embodiment of the present disclosure will be described with reference to FIG. 4. FIG. 4 is a block diagram illustrating an example of the functional configuration of the display device 100 according to the embodiment. Hereinafter, the display device 100 which the user Ua shown in FIG. 1 wears will be described.

As shown in FIG. 4, the display device 100 includes a position information acquisition unit 202, an action determination unit 204, an action information acquisition unit 206, a captured image acquisition unit 208, and a visual field information acquisition unit 210. The display device 100 further includes an image processing unit 212, a position determination unit 214, an image generation unit 216 which is an example of an object generation unit, a display control unit 218, and an action information transmission unit 220. Such a functional configuration is realized by the CPU 112 (see FIG. 3) as a display control device.

(Position Information Acquisition Unit 202)

The position information acquisition unit 202 acquires position information (in other words, position information regarding the user Ua who wears the display device 100) regarding the display device 100. The position information acquisition unit 202 acquires the position information regarding the display device 100 (the user Ua) through the GPS processing unit 128. For example, the acquired position information is information regarding a latitude, a longitude, and an altitude of the display device 100. The position information acquisition unit 202 acquires the position information at predetermined intervals.

(Action Determination Unit 204)

The action determination unit 204 determines an action of the user Ua who wears the display device 100. For example, the action determination unit 204 determines whether the user Ua is exercising. Specifically, the action determination unit 204 determines whether the user Ua is exercising based on a detection result of the acceleration sensor 134.

The action determination unit 204 may determine whether the user Ua starts a running action based on a detection result of the acceleration sensor 134. Further, the action determination unit 204 may determine an action of the user based on the position information acquired by the position information acquisition unit 202.

(Action Information Acquisition Unit 206)

The action information acquisition unit 206 acquires action information regarding a past action of the user Ub or Uc (another action) at the action position of the user Ua (one actor) who wears the display device 100 from the server 300 (see FIG. 1).

For example, the action information acquisition unit 206 acquires an exercise history of the user Ub or the user Uc as action information. Here, the acquired exercise history is a running history of the user Ub or Uc who has run at the position at which the user Ua is running. The exercise history to be acquired may be determined when the user Ua starts exercising and the user Ua selects the exercise history on a menu screen displayed on the display unit 118. Further, the exercise history to be acquired may be set in advance, for example, at the user's home before exercise.

The action information acquisition unit 206 acquires not only the action information but also map information including information regarding the altitude of the position at which another user Ub or Uc acts from the server 300. By acquiring the map information including the information regarding the altitude, the position of another user can be detected with higher accuracy.

Here, action information to be downloaded from the server 300 will be described with reference to FIG. 5. FIG. 5 is a diagram illustrating a data structure of the action information to be downloaded from the server 300. As shown in FIG. 5, the action information includes an exercise duration, the position information (the latitude, longitude, and altitude) regarding an exercise position, classification of exercise, and the like.

(Captured Image Acquisition Unit 208)

The captured image acquisition unit 208 acquires a captured image captured by the imaging unit 136. For example, the captured image acquisition unit 208 acquires the captured image (visual field image) obtained by imaging a visual field of the user by the imaging unit 136. The captured image acquisition unit 208 outputs the acquired captured image to the image processing unit 210.

(Visual Field Information Acquisition Unit 210)

The visual field information acquisition unit 210 acquires visual field information of the user Ua who wears the display device 100. The visual field information acquisition unit 210 acquires, as visual field information, for example, information regarding the direction (azimuth) of the sight line of the user Ua or the angle of the sight line of the user Ua. The direction (azimuth) of the sight line of the user Ua is detected by the electronic compass 126 which is an example of the sight line detecting unit. The angle of the sight line of the user Ua is detected by the gyro sensor 130.

(Image Processing Unit 212)

The image processing unit 212 performs various kinds of image processing on the captured image acquired by the captured image acquisition unit 208. The image processing unit 212 has a function of a determination identifying unit that identifies the range of a road on which the user is running from the captured image obtained by imaging the visual field of the user Ua by the imaging unit 136.

Hereinafter, a method of identifying the range of a road from the acquired captured image will be described with reference to FIG. 6. FIG. 6 is a diagram illustrating an example of the method of identifying the range of a road from the captured image.

As shown in FIG. 6(a), the image processing unit 212 detects a candidate area of a road by performing edge processing on the captured image captured by the imaging unit 136. In FIG. 6(a), a road and a tree are detected as candidate areas. Next, as shown in FIG. 6(b), the image processing unit 212 maps the azimuth and the angle of the sight line of the user Ua who wears the display device 100 to the road information downloaded from the position information regarding the user Ua. Next, as shown in FIG. 6(c), the image processing unit 212 identifies the range of the road using the mapped road information between the candidate areas (the road and the tree) of the road. Thus, as shown in FIG. 6(d), the range of the road is determined from the captured image.

(Position Determination Unit 214)

The position determination unit 214 determines whether another user Ub (or Uc) was located in the past at the position within the visual field of the user Ua during the action. Specifically, the position determination unit 214 determines whether the other user was located in the past within the visual field of the user based on the range of the road identified by the image processing unit 212 and the position of the other user Ub.

For example, the position determination unit 214 determines that the other user Ub is located at the position within the visual field of the one user Ua, when the other user Ub is located within the range of the road identified by the image processing unit 212. Conversely, the position determination unit 214 determines that the other user Ub is not located at the position within the visual field of the one user Ua, when the other user Ub is not located within the identified range of the road.

(Image Generation Unit 216)

The image generation unit 216 generates a virtual image transparently displayed on the display unit 118. The image generation unit 216 generates, as the virtual image, a virtual object for virtually indicating the position of the other user Ub (or the user Uc) during an action of the user Ua based on the action information acquired by the action information acquisition unit 206. Specifically, when the user Ua is running at a given position, the image generation unit 216 generates the virtual object for virtually indicating the position of the other user Ub (or the user Uc) that has run in practice at the same position in the past. Further, when a plurality of different users who have run at the same position are present, the image generation unit 216 generates the virtual object corresponding to another user selected by the user Ua.

The image generation unit 216 generates the virtual object suitable for a positional relation between the one user Ua and the other user Ub (or the user Uc). For example, when the other user Ub is running in the front of the user Ua, the image generation unit 216 generates the virtual object showing the back shape of the other user Ub. On the other hand, when the other user Ub is running in the rear of the user Ua, the image generation unit 216 generates the virtual object showing the front shape of the other user Ub.

The image generation unit 216 generates a map indicating the positions of the one user Ua and the other user Ub (or the user Uc). The image generation unit 216 causes the road to be included in the map and shows the positions of the one user Ua and the other user Ub on the road. The map is generated such that the map occupies a partial area in the corner of the display screen of the display unit 118.

(Display Control Unit 218)

The display control unit 218 causes the display unit 118 displaying the surroundings to display the virtual object generated by the image generation unit 216 in a superimposition manner.

Specifically, the display control unit 218 causes the display unit 118 to display the virtual object generated by the image generation unit 216 in the superimposition manner during the action of the user Ua who wears the display device 100. That is, when the user Ua is acting at a specific place, the display control unit 218 causes the display unit 118 to display the virtual object corresponding to the action history of the other user Ub who has acted at the same position in the past. Thus, during the action of the user Ua, given display is realized realistically using actual past action information regarding the user Ub.

The display control unit 218 causes the display unit 118 to transparently display the generated virtual object. For example, the display control unit 218 displays the virtual object in gray or only with a contour line. Thus, it is possible to prevent the visual field of the user Ua from being blocked due to the displayed virtual object.

The display control unit 218 switches the display of the virtual object depending on whether the other user Ub is located within the visual field of the one user Ua. That is, the display control unit 218 causes the display unit 118 to display the virtual object when the position determination unit 214 determines that the other user Ub is located at the position within the visual field of the user Ua. Conversely, the display control unit 218 causes the display unit 118 not to display the virtual object when the position determination unit 214 determines that the other user Ub is not located at the position within the visual field of the user Ua. Thus, the given display can be realized more realistically.

The display control unit 218 switches the display of the virtual object on the display unit 118 in accordance with the positional relation between the other user Ub and the one user Ua and the direction of the sight line of the user Ua. For example, the display control unit 218 causes the display unit 118 to display the virtual object corresponding to the other user Ub when the other user Ub is acting in the front of a traveling direction of the user Ua and it is thus detected that the sight line of the user Ua is oriented toward the front of the traveling direction. Conversely, the display control unit 218 causes the display unit 118 to display the virtual object corresponding to the other user Ub, when the other user Ub is acting in the rear of the traveling direction of the user Ua and it is thus detected that the sight line of the user Ua is oriented toward the rear of the traveling direction (that is, the user Ua is looking back). Thus, the position of the user Ub can be appropriately displayed in accordance with the sight line by switching the display of the virtual object on the display unit 118 in accordance with the direction of the sight line of the user Ua.

The display control unit 218 may cause the display unit 118 to display the virtual object when it is determined that the user Ua who wears the display device 100 starts acting. Thus, when the user Ua does not act, it is possible to prevent the virtual object from being displayed on the display unit 118.

The display control unit 218 may cause the display unit 118 not to display the virtual object when a shielding object is present between the user Ua and the other user Ub in a view from the user Ua. Then, the display control unit 218 causes the display unit 118 to display the virtual object when the user Ua passes the shielding object. Thus, in a situation in which the other user Ub would not normally be viewed due to the shielding object, it is possible to prevent the virtual object corresponding to the other user Ub from being displayed.

The display control unit 218 may change the size of the virtual object to be displayed in accordance with the distance between the other user Ub and the user Ua. For example, the display control unit 218 causes the virtual object to be displayed larger as the other user Ub is located closer to the vicinity of the user Ua.

The display control unit 218 may cause the display unit 118 to display the map showing the positions of the user Ua and the other user Ub in the superimposition manner when it is determined that the other user Ub is not located at the position within the visual field of the user Ua. Thus, by displaying the map showing the positions of the user Ua and the other user Ub, the user Ua can easily comprehend the relative position even when the user Ua is distant from the other user Ub.

Specifically, the display control unit 218 causes the display unit 118 to display the map showing the positions of the user Ua and the other user Ub when it is determined that the other user Ub is not located at the position within the visual field of the user Ua and the other user Ub is distant from the user Ua by a predetermined distance or greater. At this time, in order to prevent the visual field from being blocked by the shown map, the display control unit 218 causes the map to be transparent.

The display control unit 218 may change a scale (magnification) of the map in accordance with the distance between the other user Ub and the user Ua and display the changed map. That is, when the distance between the other user Ub and the user Ua is large, the display control unit 218 enlarges the scale of the map. When the distance between the other user Ub and the user Ua is small, the display control unit 218 reduces the scale of the map. Thus, the display unit 118 can display the positions of the other user Ub and the user Ua within the restricted display area.

(Action Information Transmission Unit 220)

The action information transmission unit 220 transmits (uploads) the action information (for example, exercise information) regarding the user Ua who wears the display device 100 to the server 300. The action information regarding the user Ua is sequentially stored in, for example, the memory 114, and thus the action information transmission unit 220 transmits the series of action information to the server 300 when the exercise is completed. Specifically, the action information transmission unit 220 transmits the exercise information shown in FIG. 5 to the server 300. Thus, the virtual object based on the action information of the user Ua can also be displayed on the display device 100 which the other user Ub wears.

<3. Display Example of Virtual Object in Display Unit>

A display example of the virtual object on the display unit 118 of the display device 100 will be described. Here, it is assumed that while the user Ua (see FIG. 1) is running a specific course, the virtual objects corresponding to the exercise histories of competitors (the users Ub and Uc) who have run the same course in the past are displayed.

Hereinafter, the description will be made in the order of a display example in which the competitors are running in the front of the user Ua, a display example in which the competitors and the user Ua are running side by side, a display example in which the competitors are running in the rear of the user Ua, and a display example in which the competitors are outside of the visual field of the user Ua.

(Display Example in which Competitors are Running in Front)

Display examples of virtual objects when competitors are running in the front of the user Ua will be described with reference to FIGS. 7 to 10. The display examples of the virtual objects to be described below are displayed when the user Ua is running in a frontward direction.

Figure 7:
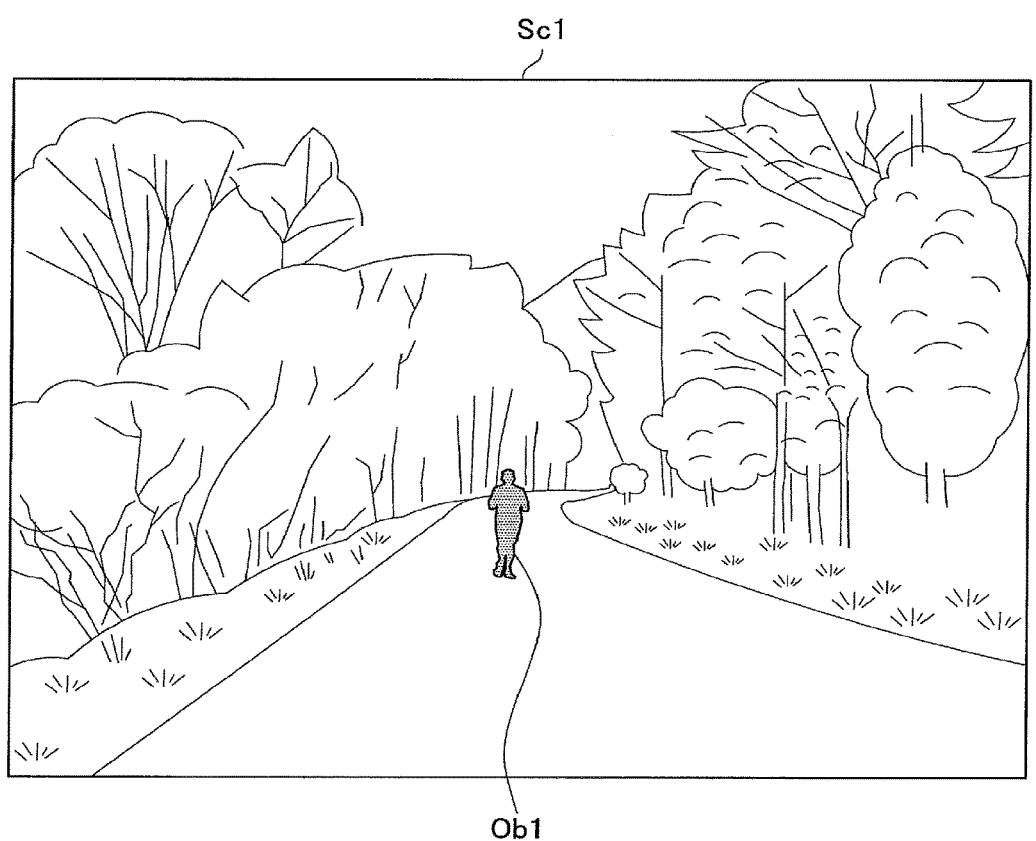
FIG. 7 is a diagram illustrating an example of a virtual object displayed on a display unit when a competitor is running in the front.

FIG. 7 is a diagram illustrating an example of the virtual object displayed by the display unit 118 when a competitor is running in the front of the user Ua. On a display screen Sc1 of FIG. 7, the shape of the competitor who is located in the front of the user Ua and is running forward in a frontward direction along a road is shown as a virtual object Ob1. In addition, the virtual object Ob1 is transparently shown so that the back of the competitor does not block the visual field of the user Ua.

Figure 8:
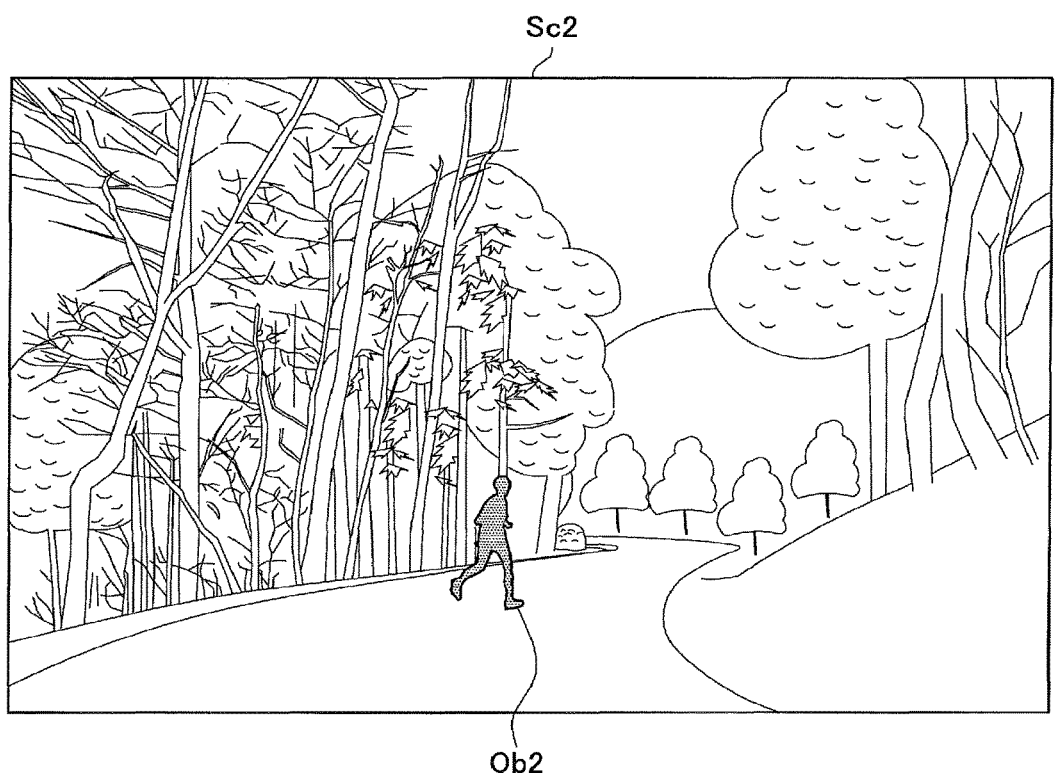
FIG. 8 is a diagram illustrating an example of a virtual object displayed on the display unit when a competitor is running in the front.

FIG. 8 is a diagram illustrating an example of a virtual object displayed by the display unit 118 when a competitor is running in the front of the user Ua. On a display screen Sc2 of FIG. 8, the shape of the competitor who is located in the front of the user Ua and is running forward in a frontward direction along a road is shown as a virtual object Ob2. In addition, the virtual object Ob2 is transparently shown so that the diagonally backward right shape of the competitor does not occupy the visual field of the user Ua.

Figure 9:
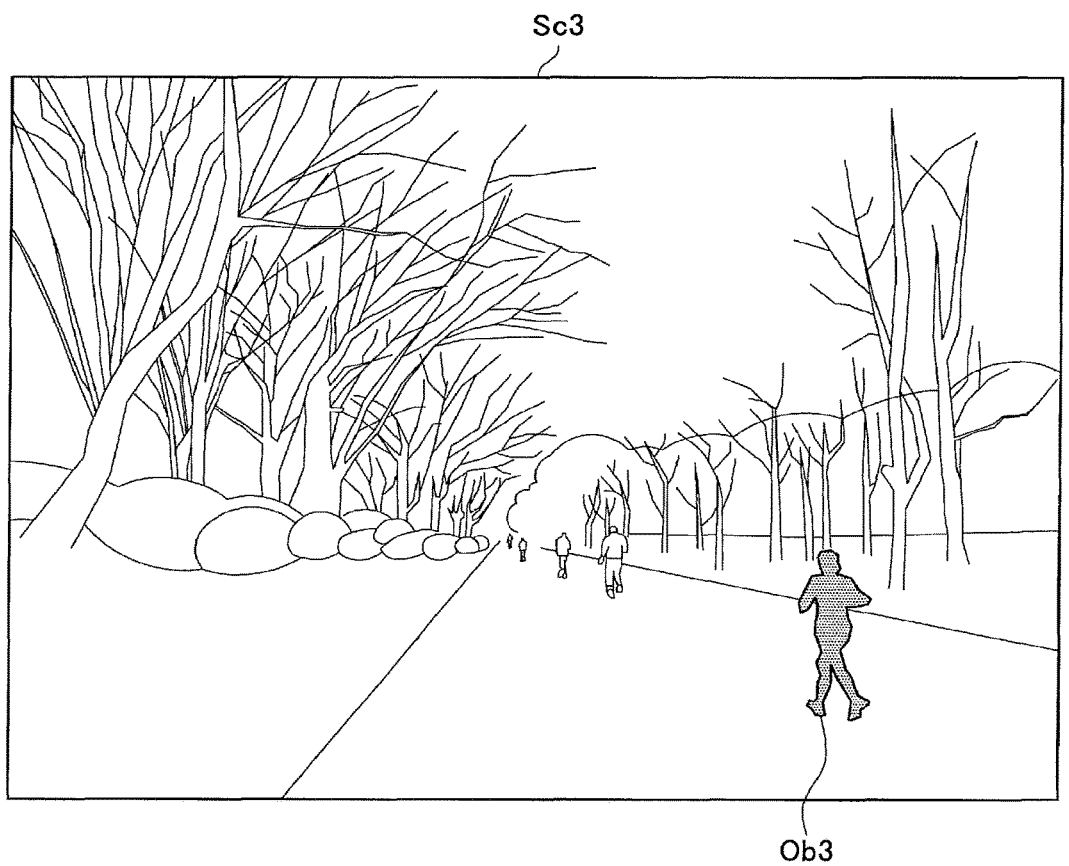
FIG. 9 is a diagram illustrating an example of a virtual object displayed on the display unit when a competitor is running in the front.

FIG. 9 is a diagram illustrating an example of a virtual objet displayed by the display unit 118 when a competitor is running in the front of the user Ua. On a display screen Sc3 of FIG. 9, the shape of the competitor who is located in the diagonally right front of the user Ua and is running forward in a frontward direction along a road is shown as a virtual object Ob3. In addition, the virtual object Ob3 is transparently shown so that the diagonally backward left shape of the competitor does not occupy the visual field of the user Ua.

(Display Example in which User and Competitor are Running Side by Side)

A display example of a virtual object when a competitor is running side by side with the user Ua will be described with reference to FIG. 10. The display example of the virtual object described here is displayed when the running user Ua is viewing aside.

Figure 10:
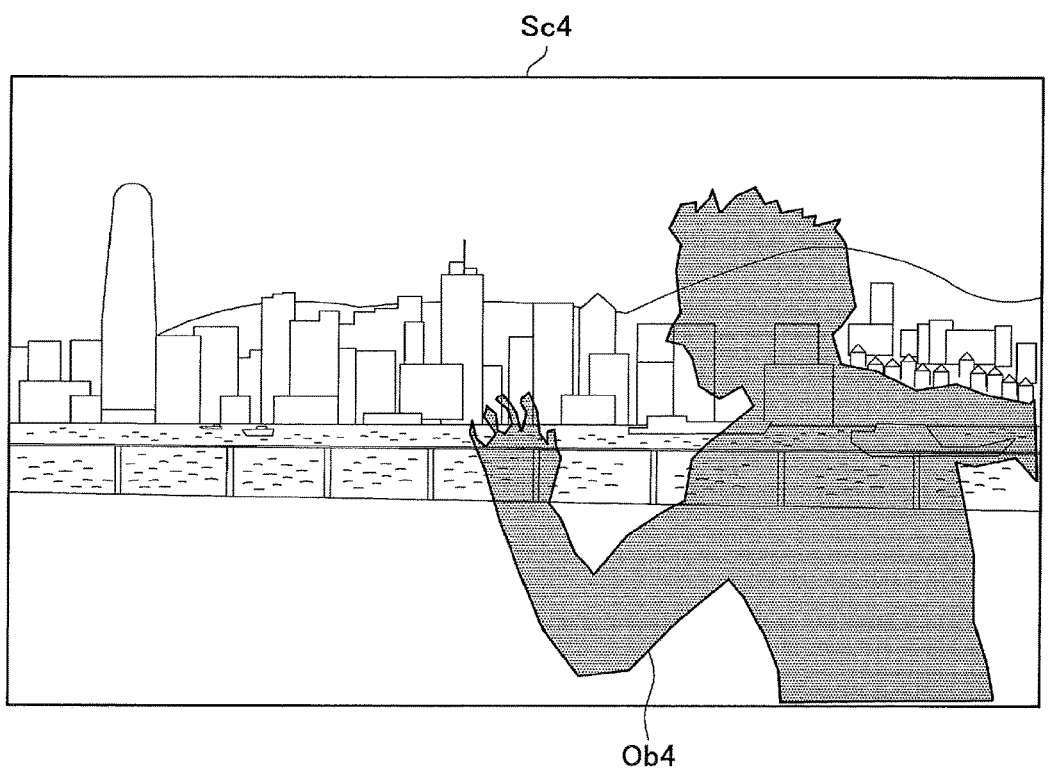
FIG. 10 is a diagram illustrating an example of a virtual object displayed on the display unit when a competitor is running on the side.

FIG. 10 is a diagram illustrating an example of the virtual object displayed by the display unit 118 when the competitor is running side by side with the user Ua. On a display screen Sc4 of FIG. 10, the shape of the competitor who is located right beside the user Ua and is running forward in a frontward direction is shown as a virtual object Ob4. In addition, the virtual object Ob4 is transparently shown so that the shape of the competitor viewed from the left side does not occupy the visual field of the user Ua.

(Display Example in which Competitor is Running in Rear)

Display examples of virtual objects when competitors are running in the rear of the user Ua will be described with reference to FIGS. 11 and 12. The display examples of the virtual objects to be described here are displayed when the running user Ua is looking back.

Figure 11:
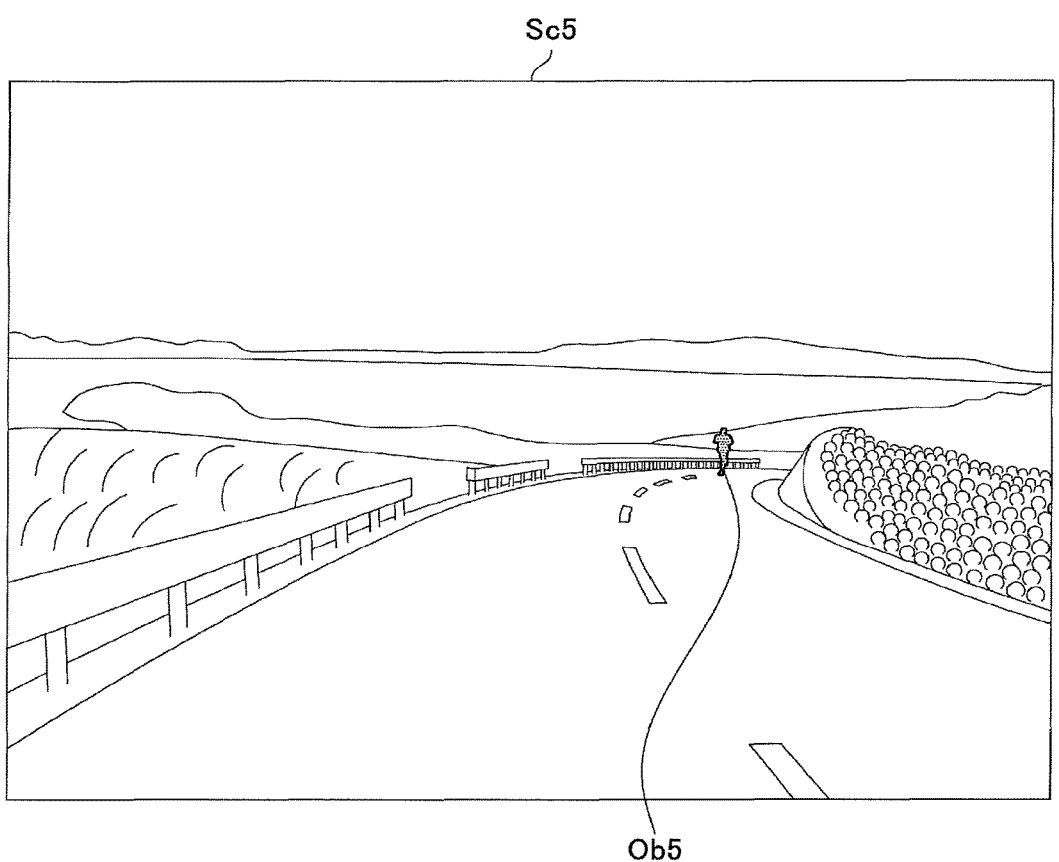
FIG. 11 is a diagram illustrating an example of a virtual object displayed on the display unit when a competitor is running in the rear.

FIG. 11 is a diagram illustrating an example of a virtual object displayed by the display unit 118 when the competitor is running in the rear of the user Ua. On a display screen Sc5 of FIG. 11, the shape of the competitor who is located in the rear of the user Ua and is running diagonally in a frontward direction along a road is shown as a virtual object Ob5. In addition, the virtual object Ob5 is transparently shown so that the diagonally front shape of the competitor does not occupy the visual field of the user Ua.

Figure 12:
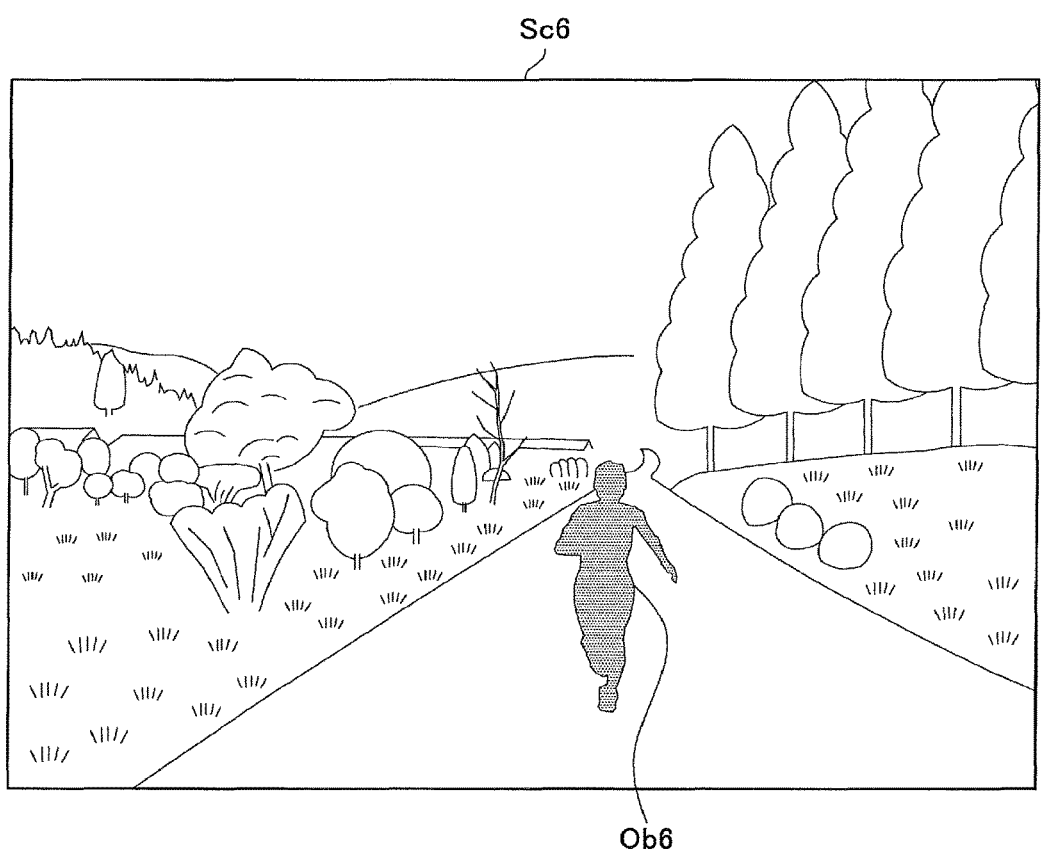
FIG. 12 is a diagram illustrating an example of a virtual object displayed on the display unit when a competitor is running in the rear.

FIG. 12 is a diagram illustrating an example of a virtual object displayed by the display unit 118 when the competitor is running in the rear of the user Ua. On a display screen Sc6 of FIG. 12, the shape of the competitor who is located right behind the user Ua and is running to the front side is shown as a virtual object Ob6. In addition, the virtual object Ob6 is transparently shown so that the front shape of the competitor approaching the user does not occupy the visual field of the user Ua.

In the above-described display examples, the display of the virtual object superimposed on a scene is switched when the sight line of the user is moving. Thus, the user can perceive the relative position of the competitor more realistically.

(Display Example in which Competitor is Outside of Visual Field)

In the above-described display examples of FIGS. 7 to 12, the competitor is located within the visual field of the user. On the other hand, when the competitor is not located within the visual field of the user, the competitor is not displayed in the scene. In this case, the user may not comprehend the positional relation between the user and the competitor.

The display unit 118 according to the embodiment displays a map showing the positions of the competitor and the user, instead of a virtual object, when the competitor is outside of the visual field of the user. Thus, the user can easily comprehend the position relation between the competitor and the user, while viewing the map showing the positions of the competitor and the user. Hereinafter, a display example of the map when the competitor is outside of the visual field of the user will be described with reference to FIGS. 13 and 14.

Figure 13:
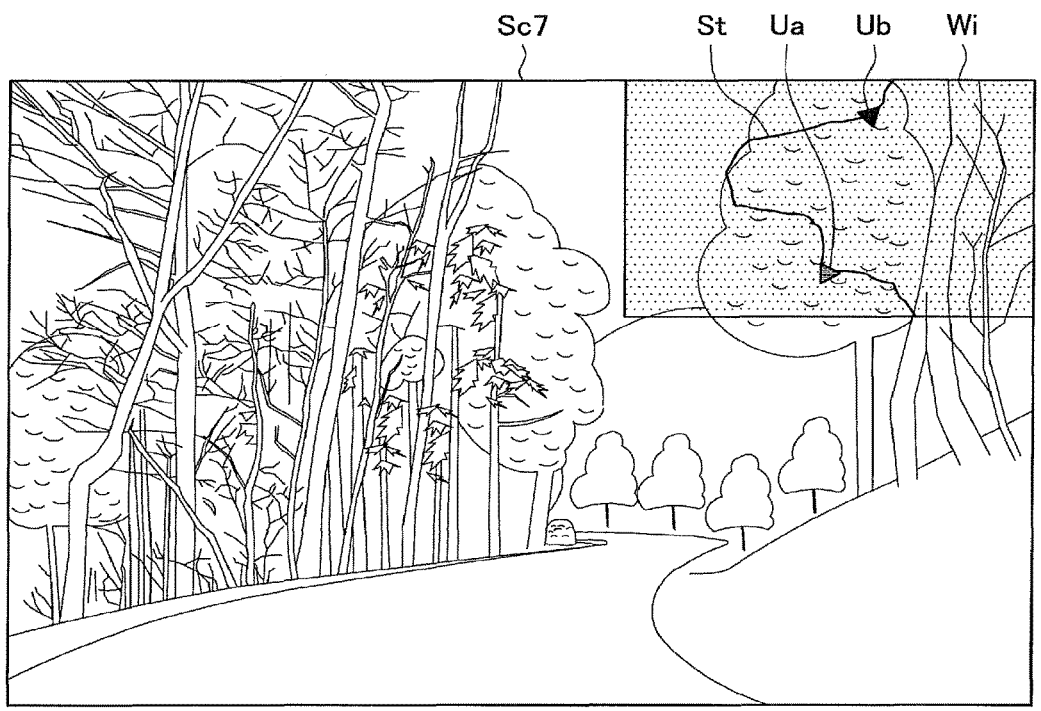
FIG. 13 is a diagram illustrating an example of a map displayed on the display unit when a competitor is outside of a field of view.

FIG. 13 is a diagram illustrating an example of a map displayed by the display unit 118 when the competitor is outside of the visual field. As shown on a display screen Sc7 of FIG. 13, a map showing the positions of the user Ua and the competitor Ub on a road St is shown in a partial area of a transparent display showing a scene. The displayed map is transparently displayed so as not to occupy the visual field of the user Ua. Further, the positions of the user Ua and the competitor Ub are displayed with, for example, different colors or marks so that the user can distinguish the positions of the user Ua and the competitor Ub from each other.

Figure 14:
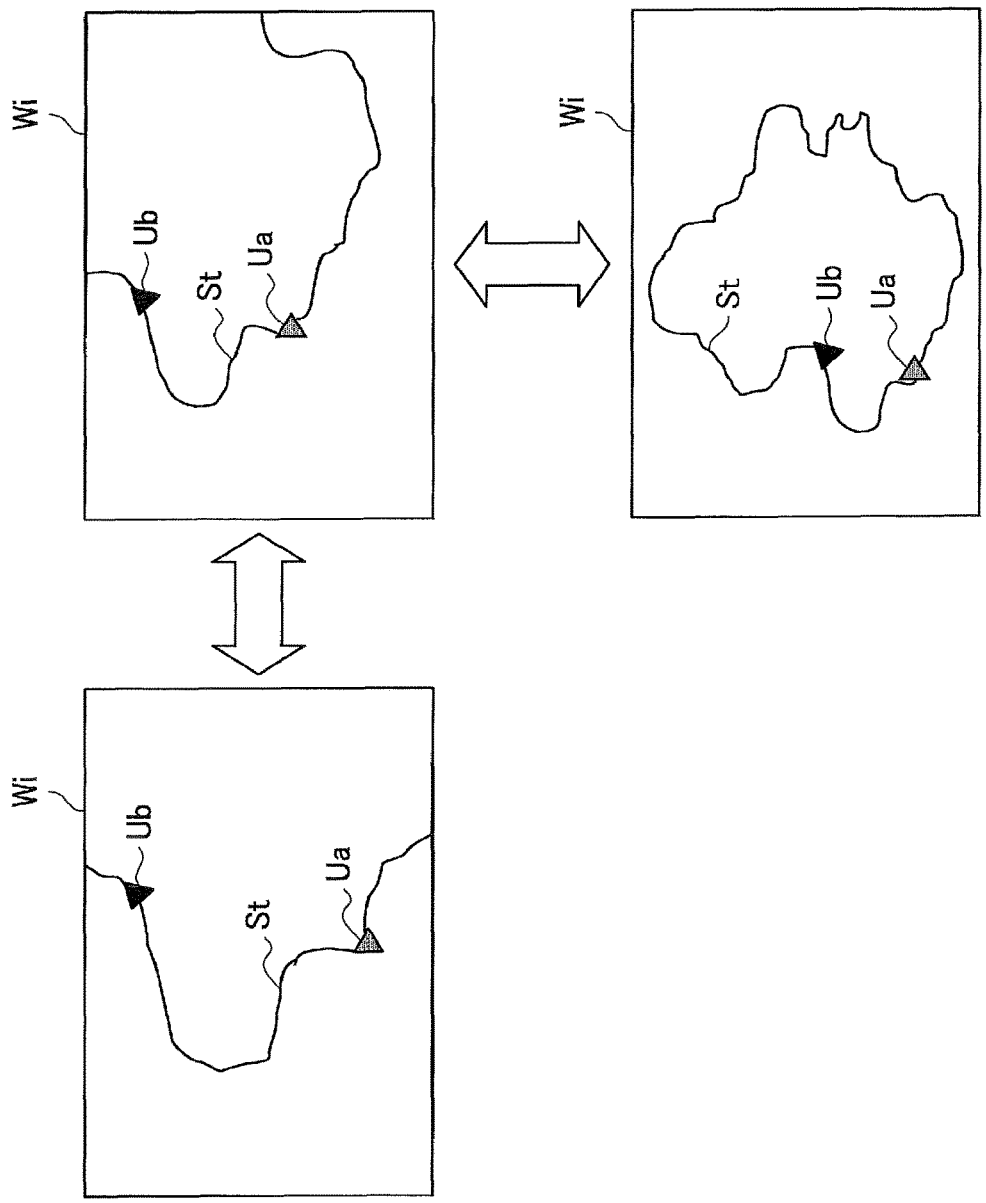
FIG. 14 is a schematic view illustrating an example of map displays showing the positions of a user and a competitor.

Here, the displayed map can be displayed while changing the scale (magnification) of the map in accordance with the positions of the user and the competitor to display the positions of both the user and the competitor, as shown in FIG. 14. FIG. 14 is a schematic diagram illustrating examples of map displays in which the positions of the user and the competitor are shown. In FIG. 14, the display examples of three maps with different scales are shown. Thus, by displaying the maps while changing the scale (magnification) of the map in accordance with the positions of the user and the competitor, the user can immediately comprehend the positional relation between the user and the competitor.

In the above-described display examples of FIGS. 7 to 12, only one competitor is displayed, but the embodiment of the present disclosure is not limited thereto. A plurality of competitors may be displayed. The display form of a competitor is not limited to the display examples (in which a competitor is displayed as a gray area) of FIGS. 7 to 12. A display form (for example, display of only the contour line of a competitor) in which the user can perceive a competitor may be used.

<4. Flow of Process Performed by Display Device>

Figure 15:
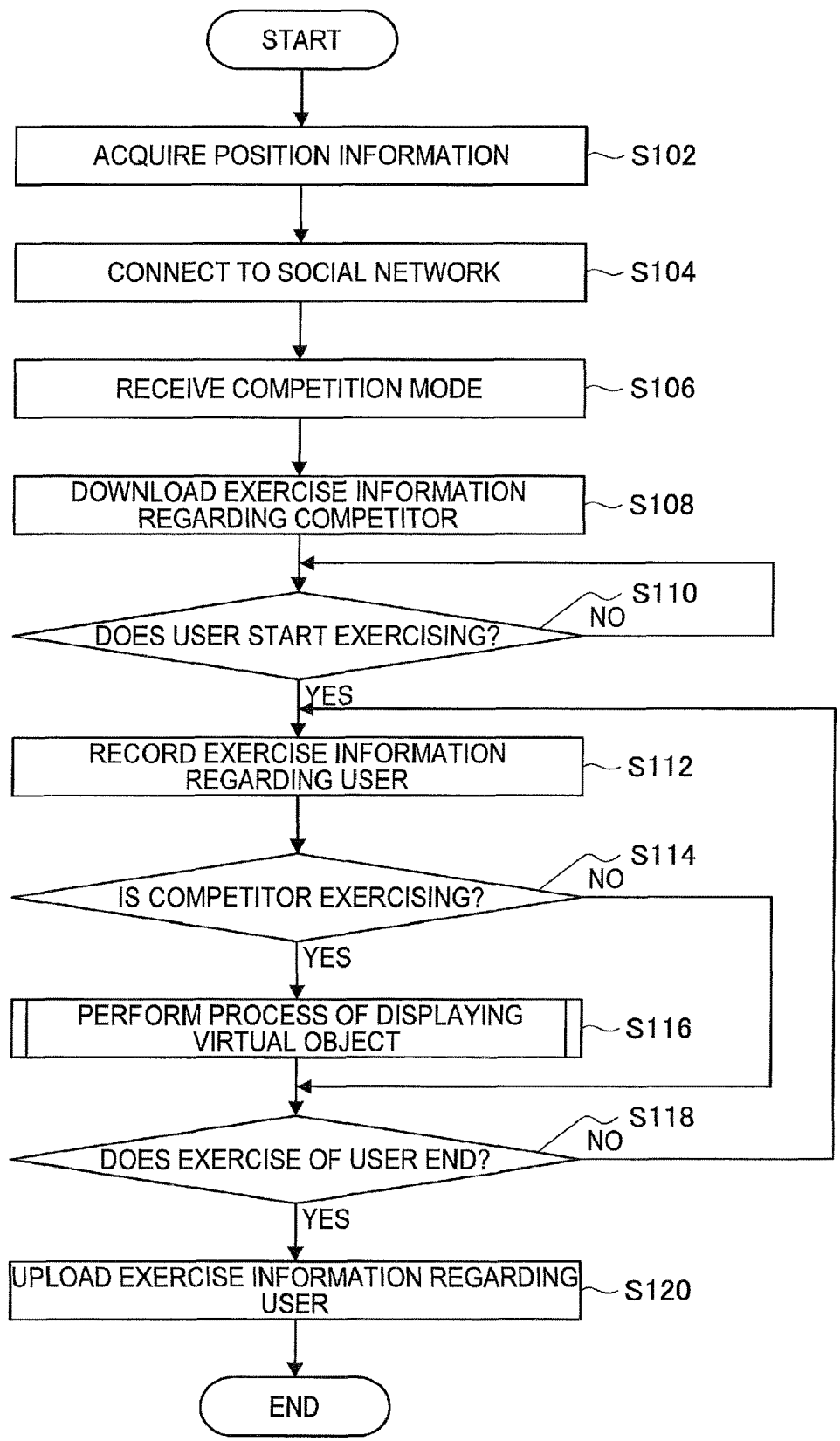
FIG. 15 is a flowchart illustrating an example of a flow of a process performed by the display device according to the embodiment.

An example of the flow of a process performed by the display device 100 according to the embodiment will be described with reference to FIG. 15. FIG. 15 is a flowchart illustrating an example of a flow of the process performed by the display device 100 according to the embodiment.

The position information acquisition unit 202 of the display device 100 acquires position information (position information regarding the user who wears the display device 100) regarding the display device 100 (step S102). That is, the position information acquisition unit 202 acquires information regarding the latitude, longitude, and altitude of the display device 100 (user) through the GPS processing unit 128.

Next, the display device 100 is connected to a social network by the radio communication unit 124 (step S104). Next, the display device 100 receives a competition mode input by the user Ua (step S106). At this time, the user Ua can select a competitor through the input unit 122.

Next, the action information acquisition unit 206 downloads exercise information regarding another user (competitor) from the server 300 (step S108). Then, the action determination unit 204 determines whether the user Ua who wears the display device 100 starts exercising based on a detection result of the acceleration sensor 134 (step S110)

When the action determination unit 204 determines that the user starts exercising in step S110 (Yes), the display device 100 records the exercise information regarding the user Ua in the memory 114 (step S112). Next, the display device 100 determines whether the competitor is exercising (step S114).

When display device 100 determines that the competitor is exercising in step S114 (Yes), the display control unit 218 performs a virtual object display process of displaying a virtual object on the display unit 118 (step S116). Conversely, when the display device 100 determines that the competitor is not exercising in step S114 (No), the display control unit 218 does not perform the virtual object display process of step S116. The details of the virtual object display process of step S116 will be described below.

Next, the action determination unit 204 determines whether the user ends the exercise (step S118). When the action determination unit 204 determines that the user continues the exercise in step S118 (No), the display device 100 performs the above-described process of step S112. Conversely, when the action determination unit 204 determines that the user ends the exercise in step S118 (Yes), the display device 100 uploads the exercise data of the user to the server (step S120).

(Virtual Object Display Process)

Figure 16:
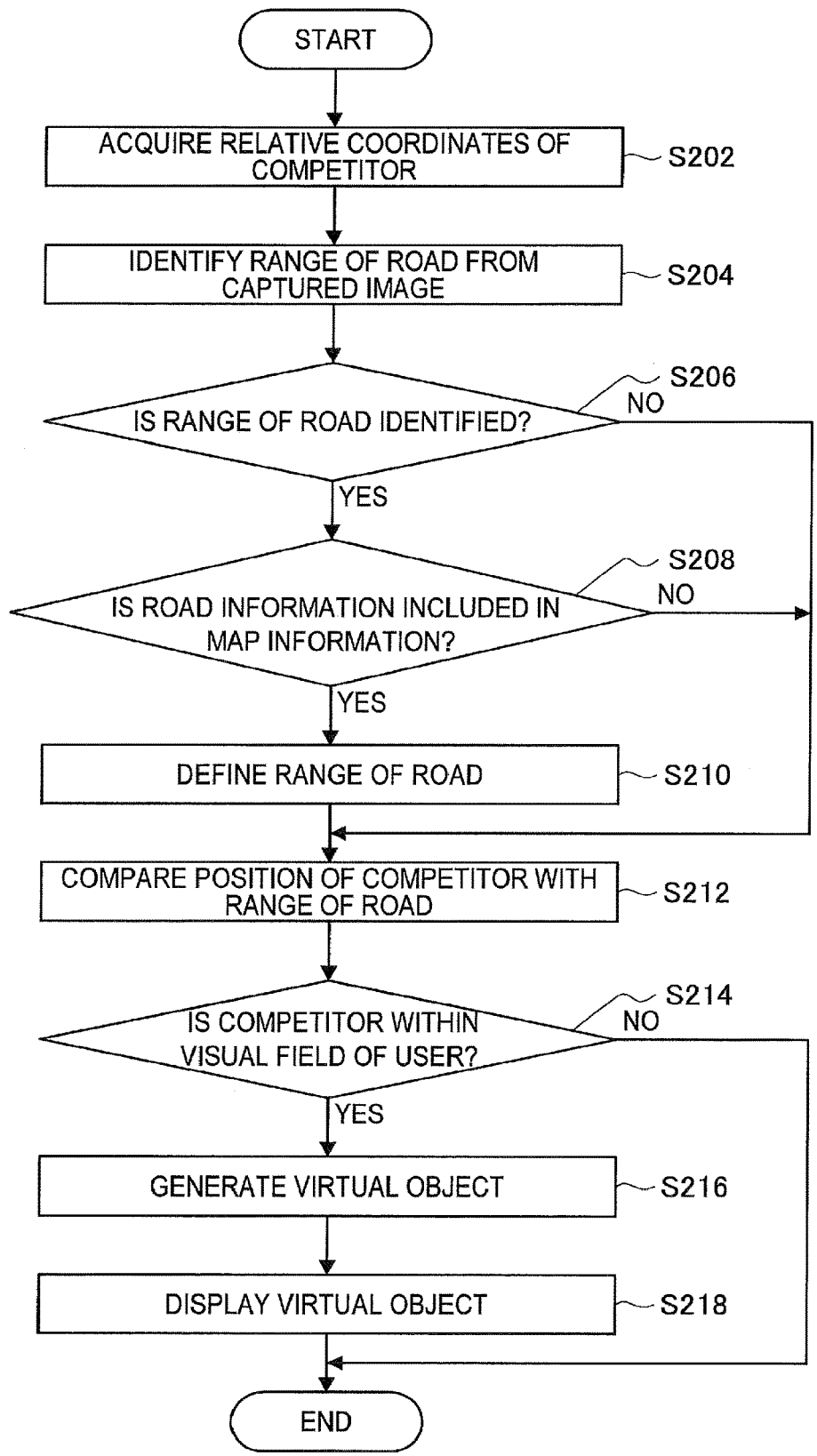
FIG. 16 is a flowchart illustrating an example of a flow of a process of displaying a virtual object.

An example of the flow of the virtual object display process of step S116 in FIG. 15 will be described with reference to FIG. 16. FIG. 16 is a flowchart illustrating an example of the flow of the virtual object display process.

The position determination unit 214 of the display device 100 acquires the relative coordinates of the competitor based on the latitudes, longitudes, and altitudes of the user and the competitor (step S202). Next, the image processing unit 212 determines the range of a road in which the user Ua is running from a captured image captured by the imaging unit 136 (step S204).

Next, when the image processing unit 212 can identify the range of the road from the determination result (Yes in step S206), the image processing unit 212 determines whether road information is included in the downloaded map information (step S208).

When the image processing unit 212 determines that the road information is included in step S208 (Yes), the image processing unit 212 performs matching between the identified range of the road and the road information to define the range of the road (step S210).

Next, the position determination unit 214 compares the position of the competitor with the range of the road (step S212). Then, the position determination unit 214 determines whether the competitor is within the visual field of the user (step S214). That is, the position determination unit 214 determines whether the competitor is located within the range of the road.

When the position determination unit 214 determines that the competitor is within the visual field of the user in step S214 (Yes), the image generation unit 216 generates a virtual object based on the coordinates of the competitor and the traveling direction of the competitor (step S216). Then, the display control unit 218 causes the display unit 118 to display the generated virtual object (step S218).

When the position determination unit 214 determines that the competitor is outside of the visual field of the user in step S214 (No), the display control unit 218 causes the display unit 118 not to display the virtual object. Further, when the competitor is distant from the user by a predetermined distance or greater, the display control unit 218 causes the display unit 118 to display the map showing the positions of the competitor and the user.

<5. Case in which Virtual Object is Displayed>

The case in which the display unit 118 displays the virtual object corresponding to the competitor based on the exercise history of another user (competitor) who has run at the specific position in the past when the user Ua who wears the display device 100 is running in a specific position has been described. However, the case in which the display unit 118 displays the virtual object is not limited to the above-described case.

For example, the display unit 118 may display the virtual object based on the exercise history of the other user (competitor) when the user Ua is performing an action (exercise) other than running. Here, examples of the action other than running include bicycling, swimming, automobile driving, motorcycling, sailing, flying, and paragliding.

In a specific facility, a virtual object may be displayed as a guide function. For example, when an area is divided minutely and a user is located in a specific area in a gallery, a zoo, a park, an amusement facility, or the like, a virtual object such as a video may be automatically displayed. Further, a past movement of another person playing a guiding role may be displayed as a virtual object based on movement information. Likewise, a virtual object may be displayed and used as a guide in a route or the like that is difficult to search for.

Further, a virtual object may be displayed based on exercise information performed in the past event. Specifically, in one place, an atmosphere of the past event can be reproduced by displaying the virtual object based on the exercise information or the like of participants of the event performed at the same place in the past.

<6. Summarization>

As described above, the display device 100 according to the embodiment of the present disclosure generates a virtual object for virtually indicating the position of another actor (competitor) during an action of one actor (user) based on acquired action information. Then, the display device 100 can superimpose the generated virtual object on the display unit 118 displaying the surrounding scene during the action of the one actor.

Thus, when the user is exercising in a specific place, the display unit 118 displays the virtual object corresponding to the exercise history of a competitor who has exercised at the same place in the past. That is, during the action of the user, the display is realized realistically using the actual past action information of the competitor. As a result, since the user continues the action while viewing the virtual object displayed during the action, the user can compete with another actor or perform an action using the action of the other actor instead of a guide.

It should be understood by those skilled in the art that various modifications, combinations, sub-combinations and alterations may occur depending on design requirements and other factors insofar as they are within the scope of the appended claims or the equivalents thereof.

The glasses-type display device 100 (see FIG. 2) mounted on the face of a user has been described as an example of a display device that displays a virtual object, but the embodiment of the present disclosure is not limited thereto. For example, when a user drives an automobile, a virtual object may be transparently displayed on the windshield. Further, when a user exercises with a motorbike, a virtual object may be transparently displayed on a visor of a helmet.

The display device 100 has been described as a display control device that generates a virtual object and causes the display unit 118 to display the virtual object, but the embodiment of the present disclosure is not limited thereto. For example, the server 300 may be configured as a display control device that generates a virtual object and causes a display device to display the virtual object. Even in this case, when a user is exercising in a specific place, the display unit 118 displays the virtual object corresponding to exercise history of a competitor who has exercised at the same place in the past. When the server 300 serves as the display control device, the configuration of the display device 100 can be simplified.

While the steps described in the flowcharts according to the above-described embodiment naturally include processes performed chronologically in the described order, but the processes are not necessarily processed chronologically, and the steps may also include processes performed in parallel or separately. Further, the order of the chronologically processed steps may, of course, be changed appropriately, as necessary.

The process performed by an information processing device described in the specification may be realized by any one of software, hardware, and a combination of the hardware and software. For example, a program for the software is stored in a memory medium installed inside or outside each device in advance. For example, each program is read to a random access memory (RAM) and is executed by a processor such as a CPU, when the program is executed.

Additionally, the present technology may also be configured as below.

(1) A display control device including:
an action information acquisition unit that acquires, at an action position of one actor, action information regarding a past action of another actor;
an object generation unit that generates a virtual object for virtually indicating a position of the other actor during an action of the one actor based on the acquired action information; and
a display control unit that causes a display unit displaying a surrounding scene to superimpose and display the generated virtual object during the action of the one actor.

(2) The display control device according to (1), wherein the display control unit causes the display unit to transparently display the generated virtual object.

(3) The display control device according to (1) or (2), further including:
a position determination unit that determines whether the other actor is located at a position within a visual field of the one actor who is acting,
wherein the display control unit causes the display unit to display the virtual object when the position determination unit determines that the other actor is located at the position within the visual field.

(4) The display control device according to (3), wherein the display control unit causes the display unit to superimpose and display a map showing positions of the one actor and the other actor when the position determination unit determines that the other actor is not located at the position within the visual field.

(5) The display control device according to (4), wherein the display control unit causes the display unit to superimpose and display the map when the position determination unit determines that the other actor is not located at the position within the visual field and the other actor is distant from the one actor by a predetermined distance or greater.

(6) The display control device according to any one of (3) to (5),
wherein actions of the one actor and the other actor are running actions on a road,
wherein the display control device further includes:
a range identifying unit that identifies a range of the road from a captured image captured by an imaging unit that images the visual field of the one actor, and
wherein the position determination unit determines that the other actor is located at the position within the visual field when the other actor is located within the identified range of the road.

(7) The display control device according to any one of (1) to (6), further including:
a sight line detection unit that detects a direction of the sight line of the one actor,
wherein the display control unit switches display of the virtual object in the display unit in accordance with the detected direction of the sight line.

(8) The display control device according to (7), wherein the display control unit causes the display unit to display the virtual object when the other actor is acting in front of a traveling direction of the one actor and it is detected that the sight line of the one actor is oriented toward the front.

(9) The display control device according to (7), wherein the display control unit causes the display unit to display the virtual object when the other actor is acting in rear of the traveling direction of the one actor and it is detected that the sight line of the one actor is oriented toward the rear.

(10) The display control device according to any one of (1) to (9), further including:
an action determination unit that determines the action of the one actor,
wherein actions of the one actor and the other actor are running actions, and
wherein the display control unit causes the display unit to display the virtual object when the action determination unit determines that the one actor starts the running action.

(11) The display control device according to any one of (1) to (10), wherein the display control unit causes the display unit not to display the virtual object when a shielding object is present between the one actor and the other actor from a view of the one actor.

(12) The display control device according to any one of (1) to (11), wherein the action information acquisition unit acquires the action information and map information including information regarding altitude of a position at which the other actor acts.

(13) The display control device according to any one of (1) to (12), wherein the display unit is a glasses-type display unit mounted on the one actor.

(14) A display control method including:
acquiring, at an action position of one actor, action information regarding a past action of another actor;
generating a virtual object for virtually indicating a position of the other actor during an action of the one actor based on the acquired action information; and
causing a display unit displaying a surrounding scene to superimpose and display the generated virtual object during the action of the one actor.

(15) A program for causing a computer to execute:
acquiring, at an action position of one actor, action information regarding a past action of another actor;
generating a virtual object for virtually indicating a position of the other actor during an action of the one actor based on the acquired action information; and
causing a display unit displaying a surrounding scene to superimpose and display the generated virtual object during the action of the one actor.

What is claimed is:
1. A display control device, comprising:
circuitry configured to:
acquire position information of a user of the display control device from a first sensor;
determine, based on the acquired position information, whether the user is positioned within a specific area of a real space;
control, when determining that the user is positioned within the specific area, a display unit to superimpose a guidance avatar on the real space at a position within a visual field of the user, the guidance avatar corresponding to the specific area; and
control the display unit to add a predetermined object indicating a position of the guidance avatar instead of the guidance avatar when determining that the guidance avatar is located outside the visual field of the user, wherein the guidance avatar moves within the specific area independent from movement of the user.

2. The display control device of claim 1, wherein the predetermined object is at least partially transparent.

3. The display control device of claim 2, wherein the predetermined object is displayed in a peripheral region of a display screen of the display unit.

4. The display control device of claim 3, wherein the predetermined object is displayed in a corner of the peripheral region of the display screen of the display unit.

5. The display control device of claim 1, wherein the circuitry is further configured to:

control the display unit to display a map as the predetermined object, the map indicating a position of the user and a position of the guidance avatar.

6. The display control device according to claim 1, wherein the circuitry is further configured to:

change a scale of the guidance avatar in accordance With a position of the user and a position of the guide.

7. The display control device according to claim 6, wherein the circuitry is further configured to:

increase the scale of the guidance avatar in accordance with increase of a distance between the position of the user and the position of the guide.

8. The display control device according to claim 1, wherein the first sensor includes a GPS, and
the circuitry is configured to:
determine, based on the acquired position information from the GPS, whether the user is positioned within a specific facility corresponding to the specific area; and
control the display unit to display the guidance avatar corresponding to the specific facility when determining that the user is positioned within the specific facility.

9. The display control device according to claim 8, wherein the specific facility includes a plurality of specific areas, and
the circuitry is configured to determine the guidance avatar based on one of the plurality of specific areas and based on the acquired position information.

10. The display control device according to claim 8, wherein the specific facility includes at least one of a gallery, a zoo, a park, or an amusement facility.

11. The display control device according to claim 1, wherein the circuitry is further configured to:

acquire action information of the user from a second sensor;
determine whether the user is in a non-action state based on the action information; and
prevent the display unit to display the guidance avatar when determining that the user is in the non-action state based on the action information.

12. The display control device according to claim 11, wherein the second sensor includes at least one of an acceleration sensor.

13. The display control device according to claim 1, wherein the display unit is a head mounted display.

14. The display control device according to claim wherein the display unit is a screen provided to a windshield.

15. The display control device of claim 1, wherein the guidance avatar moves within the specific area on a basis of past movement of a person within the specific area.

16. The display control device claim 15, wherein the person corresponding to the guidance avatar is a person different from the user of the display control device.

17. A display control method comprising:

acquiring position information of a user of the display control device from a first sensor;
determining, based on the acquired position information, whether the user is positioned within a specific area of a real space;
controlling, when determining that the user is positioned within the specific area, a display unit to superimpose a guidance avatar on the real space at a position within a visual field of the user, the guidance avatar corresponding to the specific area; and
controlling the display unit to add a predetermined object indicating a position of the guidance avatar instead of the guidance avatar when determining that the guidance avatar is located outside the visual field of the user, wherein
the guidance avatar moves within the specific area independent from movement of the user.

18. A non-transitory computer readable medium having a computer program recorded thereon, the computer program configured to perform a method when executed on a computer, the method comprising:

acquiring position information of a user of the display control device from a first sensor;
determining, based on the acquired position information, whether the user is positioned within a specific area of a real space;
controlling, when determining that the user is positioned within the specific area, a display unit to superimpose a guidance avatar on the real space at a position within a visual field of the user, the guidance avatar corresponding to the specific area; and
controlling the display unit to add a predetermined object indicating a position of the guidance avatar instead of the guidance avatar when determining that the guidance avatar is located outside the visual field of the user, wherein
the guidance avatar moves within the specific area independent from movement of the user.

* * * * *